United States Patent Office 3,201,401
Patented Aug. 17, 1965

3,201,401
AMINOALKOXY AND AMINOALKYLTHIO-
ANILIDE COMPOUNDS
John Krapcho, Somerset, N.J., assignor to Olin Mathieson
Chemical Corporation, New York, N.Y., a corporation
of Virginia
No Drawing. Filed Sept. 17, 1964, Ser. No. 397,266
13 Claims. (Cl. 260—268)

This application is a continuation-in-part of application Serial No. 194,962, filed May 15, 1962, and of application Serial No. 368,988, filed May 20, 1964, both now abandoned.

This invention relates to new compounds and more particularly to bases of the general Formula I:

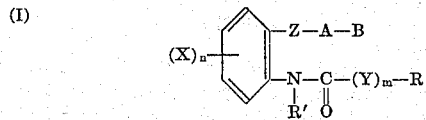

and acid-addition and quaternary ammonium salts thereof, wherein X is hydrogen, halogen (e.g., chloro and bromo), trifluoromethyl, nitro, lower alkyl, lower alkoxy and lower alkanoyl (e.g., acetyl and propionyl); $n$ is 1, 2, or 3; A is lower alkylene; B is a basic nitrogen-containing radical of less than twelve carbon atoms; Z is oxa (—O—) or thia (—S—); R' is hydrogen, lower alkyl or monocyclic aryl (lower alkyl) (e.g., benzyl and phenethyl); Y is lower alkylene, lower alkenylene, or lower alkadienylene (e.g., —CH=CH—CH=CH—); $m$ is zero or one; and R is hydrogen, lower alkyl, cycloalkyl (e.g., cyclopentyl and cyclohexyl), and $(X)_n$-substituted phenyl, furyl, thienyl, pyridyl or piperonyl.

Among the suitable radicals represented by the symbol B are: amino; (lower alkyl)amino; di(lower alkyl)amino; (hydroxy-lower alkyl)amino; di(hydroxy-lower alkyl)amino; $(X)_n$-substituted phenyl (lower alkyl) amino; N-(lower alkyl)-N-$[(X)_n$-substituted phenyl (lower alkyl)]-amino; allylamino; diallylamino; and saturated 5 to 6 membered monocyclic heterocyclic radicals of less than twelve carbon atoms, as exemplified by piperidino; (lower alkyl)piperidino; di(lower alkyl)piperidino; (lower alkoxy)piperidino; 2, 3 or 4-piperidyl; 2, 3 or 4-(N-lower alkyl-piperidyl); pyrrolidino; (lower alkyl)pyrrolidino; di(lower alkyl)pyrrolidino; (lower alkoxy)pyrrolidino; 2 or 3-pyrrolidyl; 2 or 3-(N-lower alkyl-pyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl)piperazino (e.g., $N^4$-methylpiperazino); di(lower alkyl)piperazino; (lower alkoxy)piperazino; (hydroxy-lower alkyl)piperazino (e.g., $N^4$-2-hydroxyethylpiperazino); (lower alkanoyloxy-lower alkyl)-piperazino (e.g., $N^4$-2-acetoxyethylpiperazino); (hydroxy-lower alkoxy-lower alkyl)piperazino (e.g., $N^4$-2-hydroxyethoxyethyl)piperazino, phenylpiperazino; (lower alkylphenyl)piperazino [e.g., (o-, m- or p-methylphenyl)-piperazino]; (lower alkoxyphenyl)piperazino [e.g., (o-, m- or p-ethoxyphenyl)piperazino]; (phenyl-lower alkyl)-piperazino (e.g., benzylpiperazino, phenethylpiperazino); (lower alkoxyphenyl-lower alkyl)piperazino [e.g., (o-methoxybenzyl)piperazino, (p - ethoxyphenethyl)piperazino]; (halophenyl-lower alkyl)piperazino [e.g., (p-chlorophenethyl)piperazino]; 4-(pyridyl)piperazino; and 4-(pyrimidyl)piperazino. The terms "lower alkyl," "lower alkoxy," "lower alkylene," and "lower alkenylene" as employed herein, include both straight and branched chain radicals of less than eight carbon atoms.

The preferred compounds are those wherein X is hydrogen or chloro; $n$ is one; B is di(lower alkyl)amino, $N^4$-methylpiperazino or lower alkoxyphenylpiperazino; A is ethylene or propylene; R' is hydrogen; Y is ethylene, propylene, vinylene (—CH=CH—) or —C≡C—; $m$ is one; and R is phenyl, halophenyl, 2-thienyl, 2-furyl or pyridyl. Particularly preferred are those compounds wherein X is hydrogen; B is di(lower alkyl)amino or lower alkoxyphenylpiperazino; A is ethylene or propylene; Z is thia; Y is vinylene, $m$ is one; and R is phenyl.

As to the salts, those coming within the purview of this invention include acid-addition salts, particularly the non-toxic acid-addition salts and quaternary ammonium salts, particularly the non-toxic quaternary ammonium salts. Acids useful for preparing the acid-addition salts include, inter alia, inorganic acids, such as the hydrohalic acids (e.g., hydrochloric and hydrobromic acid), sulfuric acid, nitric acid, boric acid and phosphoric acid, and organic acids, such as oxalic, tartaric, malic, citric, acetic, succinic, benzenesulfonic and toluenesulfonic acid. The acid addition salts frequently provide a convenient means for isolating the compound, e.g., by precipitating the salt in an appropriate menstruum in which the salt is insoluble, then, after separation of the salt, neutralizing with a base such as sodium hydroxide, to obtain the free base of Formula I.

Salts useful in preparing the quaternary ammonium salts include, inter alia, the lower alkyl halides and sulfates (e.g., methyl bromide and diethyl sulfate) and the monocyclic aryl(lower alkyl)halides and sulfates (e.g., benzyl chloride).

The compounds of this invention are therapeutically active substances which possess serotonin inhibitory and hypotensive activities. The position of attachment of the B–A–Z substituent on the anilide ring is critical, since, for example, 2'-(3-dimethylaminopropylthio)cinnamanilide, one of the compounds of this invention, is a very potent antiserotonin agent, whereas the para isomer, 4'(3-dimethylaminopropylthio)cinnamanilide is inactive. The compounds also have analgesic activity and when B represents a piperazino radical substituted in the 4-position with a cyclic group, the compounds are particularly effective as tranquilizers. The compounds of this invention can be administered orally or parenterally to produce tranquilization or sedation or in the treatment of hypertension, the dosage for such treatments being adjusted for the activity of the particular compound employed. Tablets, capsules, elixirs, injectables and the like, incorporating the required dosage of the base of Formula I or a physiologically acceptable acid addition salt or quaternary ammonium salt thereof together with carriers, excipients, lubricants, etc., according to accepted pharmaceutical practice may be administered.

The compounds of this invention can be prepared by a variety of methods. The preferred and general method for preparing the compounds of this invention involves reacting a compound of the general Formula II:

(II) 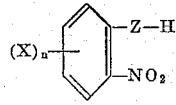

wherein Z is oxa or thia and X and $n$ are as hereinbefore defined with a compound of the formula: B—ACl or B—ABr, wherein A and B are as hereinbefore defined, the reaction being carried out in the presence of a strong base, such as sodamide, sodium methylate, sodium hydroxide, sodium hydride and potassium hydroxide, to yield new intermediates of this invention of the general Formula III:

(III) 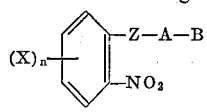

wherein X, n, Z, A and B are as hereinbefore defined.

Suitable starting materials of the Formula II utilized in the process of this invention include:

2-nitro-phenol;
2-nitrobenzenethiol;
halo-2-nitrophenols, such as
4-chloro-2-nitrophenol,
4-bromo-2-nitrophenol,
5-chloro-2-nitrophenol,
5-bromo-2-nitrophenol,
6-chloro-2-nitrophenol,
4,6-dichloro-2-nitrophenol, and
4-bromo-6-chloro-2-nitrophenol;
halo-2-nitrobenzenethiols, such as
4-chloro-2-nitrobenzene-thiol,
4-bromo-2-nitrobenzenethiol,
5-chloro-2-nitrobenzenethiol and
4,6-dichloro-2-nitrobenzenethio;
trifluoromethyl-2-nitrophenols, such as
4-trifluoromethyl-2-nitrophenol and
5-trifluoromethyl-2-nitrophenol;
trifluoromethyl-2-nitrobenzethiols, such as
4-trifluoromethyl-2-nitrobenzenethiol and
5-trifluoromethyl-2-nitrobenzenethiol;
(lower alkyl)-2-nitrophenols, such as
4-methyl-2-nitrophenol,
5-ethyl-2-nitrophenol,
4-isopropyl-2-nitrophenol,
5-n-hexyl-2-nitrophenol,
4,6-dimethyl-2-nitrophenol,
3,4,5-trimethyl-2-nitrophenol,
4,6-diethyl-2-nitrophenol, and
3-methyl-5-ethyl-2-nitrophenol;
(lower alkyl)-2-nitrobenzenethiols, such as
5-methyl-2-nitrobenzenethiol,
4-ethyl-2-nitrobenzenethiol,
4,6-dimethyl-2-nitrobenzenethiol, and
3,4,5-trimethyl-2-nitrobenzenethiol;
(lower alkoxy)-2-nitrophenols, such as
4-methoxy-2-nitrophenol,
5-ethoxy-2-nitrophenol,
4-propoxy-2-nitrophenol,
4,6-diethoxy-2-nitrophenol and
3,4,5-trimethoxy-2-nitrophenol;
(lower alkoxy)-2-nitrobenzenethiols, such as
4-methoxy-2-nitrobenzenethiol,
5-ethoxy-2-nitrobenzenethiol,
4,6-diethoxy-2-nitrobenzenethiol and
3,4,5-trimethoxy-2-nitrobenzenethiol;
(lower alkanoyl)-2-nitrophenols, such as
4-acetyl-2-nitrophenol,
5-acetyl-2-nitrophenol,
3-propionyl-2-nitrophenol and
5-hexanoyl-2-nitrophenol; and
(lower alkanoyl)-2-nitrobenzenethiols, such as
4-acetyl-2-nitrobenzenethiol,
5-acetyl-2-nitrobenzenethiol,
3-propionyl-2-nitrobenzenethiol and
5-hexanoyl-2-nitrobenzenethiol.

Suitable aminoalkyl chlorides include:

amino(lower alkyl) chlorides, such as
2-aminoethyl chloride and 3-aminopropyl chloride;
(lower alkyl)amino(lower alkyl)chlorides, such as
methylaminomethyl chloride,
2-methylaminoethyl chloride, and
3-ethylaminopropyl chloride;
di(lower alkyl)amino(lower alkyl) chlorides, such as
2-(dimethylamino)ethyl chloride,
3-(dimethylaminopropyl) chloride,
5-(diethylamino)pentyl chloride, and
2-(dipropylamino)hexyl chloride;
hydroxy(lower alkyl)amino(lower alkyl) chlorides
such as
2-(2-hydroxyethyl)-aminoethyl chloride;
di(hydroxy-lower alkyl)amino(lower alkyl) chlorides,
such as
3-(2-hydroxyethyl)aminopropyl chloride;
phenyl-(lower alkyl)amino(lower alkyl) chlorides,
such as
2-benzylaminoethyl chloride,
3-phenethylaminopropyl chloride, and
4-benzylaminobutyl chloride, and
halo, trifluoromethyl, nitro, lower alkyl and lower alkoxy substituted phenyl derivatives thereof; N-(lower alkyl)-phenyl(lower alkyl)amino chlorides, such as 2-(benzylmethylamino)-ethyl chloride, and halo, trifluoromethyl, nitro, lower alkyl and lower alkoxy substituted phenyl derivatives thereof; allyl amino-(lower alkyl) chlorides, such as 2-allylaminoethyl chloride; di-(allyl)amino(lower alkyl) chlorides, such as 3-diallylaminopropyl chloride; and saturated 5 to 6 membered monocyclic heterocyclic lower alkyl chlorides.

The nitro group is then reduced catalytically, as by treatment with hydrogen in the presence of a hydrogenation catalyst, such as 5% palladium-carbon, or chemically, as by treatment with stannous chloride or sodium hydrosulfite, to yield new intermediates of this invention of the general Formula IV:

(IV) 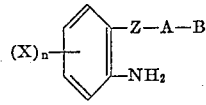

wherein X, $n$, Z, A and B are as hereinbefore defined, and the resulting amine is then reacted with a compound of the Formula V (V)          R—(Y)$_m$—CO—Cl wherein R, Y and $m$ are as hereinbefore defined, to yield the final products of this invention.

Suitable starting materials of the Formula V include:
lower alkanoyl chlorides, such as acetyl chloride, propionyl chloride and hexanoyl chloride; lower alkenoyl chlorides, such as the acyl chlorides of acrylic acid, crotonic acid, 2-pentenoic acid, 2-hexenoic acid, 2-octenoic acid, 3-methylcrotonic acid, 2-methylcrotonic acid, 2-ethylacrylic acid, 2,3-dimethylcrotonic acid and 4-methyl-2-pentenoic acid; lower alkynoyl chlorides, such as the acyl chlorides of propynoic acid, butynoic acid, 2-pentynoic acid, 2-hexynoic acid and 2-octynoic acid; lower alkadienoyl chlorides, such as sorboyl chloride; cycloalkane carbonyl chlorides, such as hexahydrobenzoyl chloride and cyclopentane carbonyl chloride; cycloalkane lower alkanoyl chlorides, such as cyclohexylacetyl chloride, 3-cyclohexylpropionyl chloride, and cyclopentylacetyl chloride; benzoyl chloride; substituted benzoyl chlorides, such as 2,4,6-trimethoxy-benzoyl chloride; phenyl(lower alkanoyl) chloride, 2-phenylpropanoyl chloride, 4-phenylbutanoyl chloride, and 6-phenylhexanoyl chloride; (substituted phenyl) (lower alkanoyl) chlorides; phenyl(lower alkenoyl) chlorides, such as acyl chlorides of cinnamic acid, 3-phenylcrotonic acid, 3-phenyl-2-pentenoic acid, 3-phenyl-2-hexenoic acid, 2-methylcinnamic acid, 2-ethylcinnamic acid and 3-phenyl-4-methyl-2-pentenoic acid; (substituted phenyl) (lower alkenyl) chlorides, such as the acyl chlorides of m-nitrocinnamic acid, p-methylcinnamic acid, o,α-dimethylcinnamic acid, p-ethylcinnamic, m,p-dimethoxycinnamic acid, p-methoxycinnamic acid, 2,4,6-trimethoxycinnamic acid, o-chlorocinnamic acid, p-chlorocinnamic acid, 3-o-tolylcrotonic acid, 2,4-dichlorocinnamic acid and 3-p-methoxyphenyl-2-pentenoic acid; phenyl(lower alkynyl) chlorides; (substituted phenyl) (lower alkynyl) chlorides, such as p-chlorophenylpropiolyl chloride; furoyl chloride; furyl (lower alkanoyl) chlorides, such as 2-furylacetyl chloride and 2-furyl-propionyl chloride; furyl(lower alkenoyl) chlorides, such as 3-(2-furyl)acrylyl chloride and 3-(2-furyl)crotonyl chloride; furyl(lower alkynoyl) chlorides; 2-thiophene carbonyl chloride; thienyl(lower alkanoyl) chlorides, such as 2-thienylacetyl chloride and 2-thienylpropionyl chloride; thienyl(lower alkenoyl) chlorides, such as 3-(2-thienyl)acrylyl chloride and 3-(2-thienyl)-crotonyl chloride; thienyl(lower alkynoyl) chlorides; 2-pyridinecarbonyl chloride; nicotinoyl chloride; isonicotinoyl chloride; pyridyl(lower alkanoyl) chlorides, such as 4-pyridylacetyl chloride and 3-(3-pyridyl)-propionyl chloride; pyridyl(lower alkenoyl) chlorides, such as 3-(4-pyridyl)acrylyl chloride and 3-(2-pyridyl)-crotonyl chloride; pyridyl(lower alkynoyl) chlorides; piperonyl carbonyl chloride; piperonyl(lower alkanoyl) chlorides, such as piperonyl-acetyl chloride and 3-piperonylpropionyl chloride; piperonyl(lower alkenoyl) chlorides, such as 3-piperonylacrylyl chloride and 3-piperonylcrotonyl chloride; and piperonyl(lower alkynol) chlorides.

Alternatively, those compounds of this invention wherein Z is thia can be prepared by reacting a compound of the general Formula VI:

(VI) 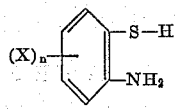

wherein X and $n$ are as hereinbefore defined, with a compound of the general Formula: B—ACl, wherein A and B are as hereinbefore defined, the reaction being conducted in the presence of a strong base, such as sodamide, to yield a compound of the general Formula IV and then reacting this compound with a compound of the Formula V, as hereinbefore described. Suitable starting materials of the Formula VI utilizable in this process are compounds corresponding to the benzenethiols mentioned hereinbefore, with an amino group substituted for the nitro group.

Still another method for preparing the compounds of this invention entails the reaction of a compound of the general Formula VII:

(VII) 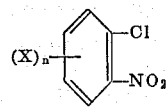

wherein X and $n$ are as hereinbefore defined, with a compound of the general Formula VIII:

(VIII)
HZ—A—B wherein A, B and Z are as hereinbefore defined, the reaction being conducted in the presence of a strong base, such as sodamide, to yield compounds of the general Formula III, which are then treated as described hereinbefore to yield the final products of this invention.

The compounds of this invention which contain a thio group can also be prepared by employing a benzothiazepin-4-one of the general Formula IX as the starting material:

(IX) 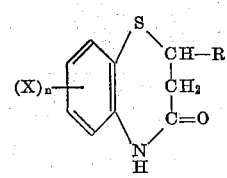

wherein X, $n$, and R are as hereinbefore defined. The benzothiazepin-4-one is reacted with sodamide to cleave the ring to yield intermediates of this invention of the general Formula X:

(X) 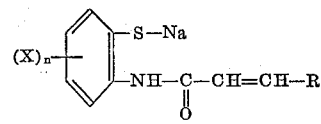

wherein X, $n$ and R are as hereinbefore defined.

Compounds X are then reacted with an aminoalkyl chloride of the formula: B—ACl, wherein A and B are as hereinbefore defined, to yield the final products of this invention of the Formula I, wherein Z is thia and Y is lower alkenylene.

Compounds X may alternatively be reacted with a haloalkyl halide, e.g., Br-lower alkylene-Cl, the reaction product treated with sodium iodide and then with a substituted piperazine to obtain compounds of Formula I wherein B is a substituted piperazino radical.

If desired, these compounds can then be hydrogenated to yield the products of this invention wherein Y is lower alkylene.

Suitable starting materials of the formula IX include:
3,5-dihydro-1,5-benzothiazepin-4-one;
3,5-dihydro-2-(lower alkyl)-1,5-benzothiazepine-4-ones, such as 3,5-dihydro-2-methyl-1,5-benzothiazepin-4-one and 3,5-dihydro-2-$n$-butyl-1,5-benzothiazepin-4-one;
3,5-dihydro-2-phenyl-1,5-benzothiazepin-4-one;
3,5-dihydro-2-halophenyl-1,5-benzothiazepin-4-ones, and 3,5-dihydro-2-o-bromophenyl-1,5-benzothiazepin-4-one;
3,5-dihydro-2-trifluoromethylphenyl-1,5-benzothiazepin-4-ones;
3,5-dihydro-2-(lower alkyl) phenyl-1,5-benzothiazepin-4-ones; such as
3,5-dihydro-2-p-tolyl-1,5-benzothiazepin-4-one;
3,5-dihydro-2-(lower alkoxy)phenyl-1,5-benzothiazepin-4-ones;
3,5-dihydro-2-phenyl(lower alkyl)-1,5-benbzothiazepin-4-ones; such as
3,5-dihydro-2-benzyl-1,5-benzothiazepin-4-one;
3,5-dihydro-2-furyl-1,5-benzothiazepin-4-one;
3,5-dihydro-2-thienyl-1,5-benzothiazepin-4-one;
3,5-dihydro-2-pyridyl-1,5-benzothiazepin-4-ones;
3,5-dihydro-2-piperonyl-1,5-benzothiazepin-4-one;
and benzo substituted derivatives thereof, such as halo, trifluoromethyl, nitro, lower alkyl and lower alkoxy substituted derivatives, as exemplified by
7-chloro-3-5-dihydro-1,5-benzothiazepin-4-one,
2-phenyl-7-trifluoromethyl-3,5-dihydro-1,5-benzothiazepin-4-one,
2-phenyl-8-nitro-3,5-dihydro-1,5-benzothiazepin-4-one,
2,7-dimethyl-3,5-dihydro-1,5-benzothiazepin-4-one, and
7-methoxy-3,5-dihydro-1,5-benzothiazepin-4-one.

To prepare these compounds of this invention wherein R' is lower alkyl or monocyclic aryl(lower alkyl), compounds of the general Formula XI:

)XI) 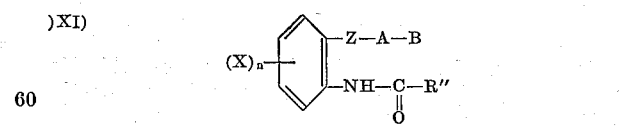

wherein X, $n$, Z, A and B are as hereinbefore defined, and R" is hydrogen, lower alkyl, monocyclic aryl or monocyclic aryl (lower alkyl), are prepared by interacting a compound of the general Formula IV with an acyl chloride of the formula: R"—COCl, wherein R" is as hereinbefore defined.

Among the suitable acyl chlorides can be mentioned lower alkanoyl chlorides, such as acetyl chloride, propionyl chloride, butyryl chloride, and hexanoyl chloride; and monocyclic aryl lower alkanoyl chlorides, such as benzoyl chloride, phenacetyl chloride, β-phenylpropionyl chloride, and 6-phenylhexanoyl chloride.

The resulting amides (Compounds XI) are then reduced, as by treatment with lithium aluminum hydride, to yield new intermediates of this invention of the general Formula XII:

(XII) 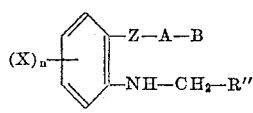

wherein X, n, Z, A, B and R″ are as hereinbefore defined, which are then reacted with a compound of the general Formula V to yield final products of this invention, wherein R′ is lower alkyl or monocyclic aryl (lower alkyl). The acid-addition and quaternary ammonium salts of this invention can be prepared in the usual manner by treatment of the free base with at least one equivalent of the desired acid or quaternizing agent.

The following examples illustrate the invention (all temperatures being in centigrade):

EXAMPLE 1

*4-chloro-2′-(3-dimetylaminopropylthio)cinnanamilide, hydrochloride*

(a) *Preparation of 2′-(3-dimethylaminopropylthio)aniline.*—A suspension of 29 g. of sodamide in 1.0 l. of toluene is treated with a solution of 90 g. of 2-aminothiophenol in 300 ml. toluene. The mixture is then warmed on a steam bath and maintained at 85–90° for thirty minutes, cooled to room temperature and treated with a solution of 93.5 g. of 3-dimethylaminopropyl chloride in 460 ml. of toluene. The material is then refluxed for five hours, cooled, treated with 100 ml. of water and the aqueous layer discarded. The organic phase is added portionwise to a cold solution of 100 ml. of concentrated hydrochloric acid in 300 ml. of water and the mixture shaken. The organic phase is discarded, the aqueous layer cooled and treated with a cold solution of 50 g. of sodium hydroxide in 100 ml. of water. The product is extracted with 500 ml. portions of ether (three times) and dried over magnesium sulfate. After evaporation of the solvent, the residue is fractionated to give about 100.5 g. of pale yellow liquid; B.P. about 109–113° (0.1 mm.).

(b) *Preparation of 4-chloro-2′-(3-dimethaylaminopropylthio)cinnamanilide, hydrochloride.*—A solution of 11.1 g. of p-chlorocinnamoyl chloride in 150 ml. of chloroform is cooled to 15° and treated dropwise with a solution of 11.6 g. of material from part (a) in 50 ml. chloroform. The mixture is stirred at room temperature for thirty minutes, refluxed for one hour, cooled and diluted with 300 ml. of ether to give about 22 g. of product; M.P. about 140–145°. This material is dissolved in 200 ml. of hot acetonitrile, filtered from the small amount of insoluble material, and the filtrate allowed to cool yielding about 16.1 g. of colorless product; M.P. about 148–150°.

EXAMPLE 2

*2-chloro-2′(3-dimethylaminopropylthio)cinnamanilide, hydrochloride*

Interaction of 21.0 g. of o-chlorocinnamoyl chloride with 21.0 g. of material from Example 1, part (a) in chloroform solution according to the procedure of Example 1, part (b) gives a colorless solid which is crystallized from acetonitrile; M.P. about 144–145°.

EXAMPLE 3

*2′-(3-dimethylaminopropylthio)acetanilide, hydrochloride*

A solution of 7.9 g. acetyl chloride in 200 ml. of benzene is cooled to 15° and treated dropwise with a solution of 21.0 g. of material from Example 1, part (a) in 100 ml. of benzene. The mixture is stirred at room temperature for thirty minutes, refluxed for one hour, cooled and the colorless product filtered to give 2′ - (2 - dimethylaminopropylthio)acetanilide, hydrochloride.

EXAMPLE 4

*N-ethyl-2′-(3-dimethylaminopropylthio)cinnamanilide, hydrochloride*

(a) *Preparation of N-ethyl-2′-(3-dimethylaminopropylthio)aniline.*—A solution of 27.0 g. of material from Example 3 in 200 ml. of water is cooled and treated with a solution of 14 g. of potassium carbonate in 50 ml. of water. The liberated base is extracted with 100 ml. portions of ether (three times) and the combined extract dried over magnesium sulfate. The mixture is filtered and the filtrate added dropwise to a slurry of 4 g. of lithium aluminum hydride in 200 ml. of dry ether. After stirring the mixture for eight hours, the mixture is cooled and treated dropwise with 5 ml. of water, followed by a solution of 2 g. of sodium hydroxide in 10 ml. of water. The mixture is filtered, the filtrate dried over magnesium sulfate, filtered and the solvent evaporated to give N-ethyl-2′-(3-dimethylaminopropylthio) aniline.

(b) *Preparation of N-ethyl-2′-(3-dimethylaminopropylthio)cinnamanilide, hydrochloride.*—A solution of 8.4 g. of cinnamoyl chloride in 100 ml. of benzene is cooled to 15° and treated dropwise with a solution of 11.9 g. of material from step a in 50 ml. of benzene. The mixture is refluxed for one hour, cooled and filtered, N-ethyl-(3-dimethylaminopropylthio)cinnamanilide hydrochloride is formed.

EXAMPLE 5

*N-benzyl-(3-dimethylaminopropylthio)cinnamanilide, hydrochloride*

Sustitution of 14.0 g. of benzoyl chloride for the acetyl cloride in Example 3 gives 2′-(3-dimethylaminopropylthio)benzanilide, hydrochloride. Treatment of this material in the same manner as in Example 4, step a, gives N-benzyl-2′ - (3-dimethylaminopropylthio)aniline. The reaction of this material with one equivalent of cinnamoyl chloride in the same manner as in Example 4, step b, gives N-benzyl-2′-(3-dimethylaminopropylthio)cinnamanilide, hydrochloride.

EXAMPLE 6

*2′-(3-diethylaminopropylthio)cinnamanilide, hydrochloride*

(a) *Preparation of 2′-(3-diethylaminopropylthio) aniline.*—Substitution of 164 g. of 3-diethylaminopropyl chloride for the 3-dimethylaminopropyl chloride in Example 1, part (a) gives 2′-(3-diethylaminopropylthio) aniline; B.P. about 115–117° (0.2 mm.).

(b) *Preparation of 2′-(3-diethylaminopropylthio)cinnamanilide, hydrochloride.*—Interaction of 33.4 g. of material from part (a) with 23.4 g. of cinnamoyl chloride in chloroform as in Example 1, part (b), gives about 54 g. of product; M.P. about 178–180°. After crystallization from acetonitrile, the product weighs about 46 g., M.P. about 179–181°.

EXAMPLE 7

*2′-(3-diethylaminopropylthio)sorbanilide hydrochloride*

Following the procedure of Example 6, but substituting an equivalent amount of sorboyl chloride for the cinnamoyl chloride in part (b), 2′-(3-diethylaminopropylthio)sorbanilide, hydrochloride is obtained.

EXAMPLE 8

*2′-(3-diethylaminopropylthio)furanilide hydrochloride*

Following the procedure of Example 6, but substituting an equivalent amount of furoyl chloride for the cinnamoyl chloride in part (b), 2′-(3-diethylaminopropylthio)furanilide, hydrochloride is obtained.

EXAMPLE 9

2′-(3-diethylaminopropylthio)hexahydrobenzanilide hydrochloride

Following the procedure of Example 6, but substituting an equivalent amount of hexahydrobenzoyl chloride for the cinnamoyl chloride in part (b), 2′-(3-diethylaminopropylthio)hexahydrobenzanilide, hydrochloride is obtained.

EXAMPLE 10

2′-(3-diethylaminopropylthio)-3,4,5-trimethoxybenzanilide hydrochloride

Following the procedure of Example 6, but substituting an equivalent amount of 3,4,5-trimethoxybenzoyl chloride for the cinnamoyl chloride in part (b), 2′-(3-diethylaminopropylthio)-3,4,5-trimethoxybenzanilide hydrochloride is obtained.

EXAMPLE 11

2′-(3-diethylaminopropylthio)phenacetanilide hydrochloride

Following the procedure of Example 6, but substituting an equivalent amount of phenacetyl chloride for the cinnamoyl chloride in part (b), 2′-(3-diethylaminopropylthio)phenacetanilide, hydrochloride is obtained.

EXAMPLE 12

2′-(3-diethylaminopropylthio)-2,4-dichlorocinnamanilide hydrochloride

Following the procedure of Example 6, but substituting an equivalent amount of 2,4-dichlorocinnamoyl chloride for the cinnamoyl chloride in part (b), 2′-(3-diethylaminopropylthio)-2,4-dichlorocinnamanilide, hydrochloride is obtained.

EXAMPLE 13

2′-(3-diethylaminopropylthio)phenylpropiolyl anilide hydrochloride

Following the procedure of Example 6, but substituting an equivalent amount of phenylpropiolyl chloride for the cinnamoyl chloride in part (b), 2′-(3-diethylaminopropylthio)phenylpropiolylanilide hydrochloride is obtained.

EXAMPLE 14

4′-chloro-2′-(2-dimethylaminoethylthio)-p-methylcinnamanilide, hydrochloride

(a) *Preparation of 4′-chloro - 2′ - (2-dimethylaminoethylthio)aniline.*—This material is prepared by the reaction of equivalent quantities of 4-chloro-2-aminothiophenol with 2-dimethylaminoethyl chloride according to the procedure used in Example 1, part (a).

(b) *Preparation of 4′-chloro-2′ - (2 - dimethylaminoethylthio)-p-methylcinnamanilide, hydrochloride.*—This material is prepared by the interaction of the material from part (a) with one equivalent of p-methylcinnamoyl chloride according to the procedure used in Example 1, part (b).

EXAMPLE 15

2′-(3-dimethylaminopropoxy)cinnamanilide, hydrochloride

(a) *Preparation of 2′-(3-dimethylaminopropoxy)nitrobenzene.*—A suspension of 27 g. of sodium methylate in 850 ml. of isopropyl alcohol is treated with a solution of 70 g. of o-nitrophenol in 150 ml. of isopropyl alcohol. The resulting slurry is stirred for thirty minutes, treated with a solution of 68 g. of 3-dimethylaminopropyl chloride in 340 ml. of toluene and the mixture is stirred and refluxed for six hours. The solvent is removed under reduced pressure. The residue is cooled, treated with 200 ml. of water and extracted with 500 ml. portions of ether (four times). After drying over magnesium sulfate, the solvent is evaporated and the residue fractionated to give about 57.0 g. of pale yellow oil; B.P. about 135–140° (0.3 mm.).

(b) *Preparation of 2′-(3-dimethylaminopropoxy)aniline.*—A solution of 56.4 g. of material from part (a) in 150 ml. of absolute alcohol is treated with a suspension of 5 g. of 5% palladium carbon in 50 ml. of absolute alcohol and the mixture placed in a hydrogenator at sixty pounds of hydrogen. Reduction is complete in one hour. The catalyst is filtered, the filtrate evaporated under reduced pressure and the residue fractionated to give about 42.6 g. of colorless product; B.P. about 110–114° (0.2 mm.).

(c) *Preparation of 2′-(3-dimethylaminopropopoxy)cinnamanilide, hydrochloride.*—A solution of 28.4 g. of cinnamoyl chloride in 200 ml. of chloroform is stirred and cooled to 15° and then treated dropwise (fifteen minutes) with a solution of 33 g. of material from part (b) in 100 ml. of chloroform while maintaining the reaction temperature at 15–20°. A precipitate separates from the mixture. The mixture is stirred at room temperature for one hour, refluxed for one hour, cooled and the mixture is diluted with 600 ml. of ether to give about 60 g. of colorless solid; M.P. about 176–178°. Crystallization from 600 ml. of acetonitrile gives about 52 g. of material; M.P. about 178–180°. Recrystallization from 300 ml. of absolute alcohol gives about 46.5 g. of colorless product; M.P. about 179–181°.

EXAMPLE 16

5′-acetyl-2′-(2-dimethylaminopropoxy)cinnamanilide hydrochloride

Substitution of 91 g. of 4-hydroxy-3-nitroacetophenone for the nitrophenol in part (a) of Example 15 gives 4-(3-dimethylaminopropoxy) - 3-nitroacetophenone. Reduction of this material as in part (b) of Example 15 gives 4-(3-dimethylaminopropoxy) - 3 - aminoacetophenone. The reaction of this product with cinnamoylchloride as in part (c) of Example 15 gives 5′-acetyl-2′-(3-dimethylaminopropoxy)cinnamanilide, hydrochloride.

EXAMPLE 17

2′-(3-dimethylaminopropylthio)cinnamanilide

A suspension of 9.6 g. sodium hydride dispersion (50%) in 500 ml. of toluene is treated with a suspension of 50.8 g. of 3,5-dihydro-2-phenyl-1,5-benzothiazepin-4-one in 500 ml. of toluene. After stirring for five minutes at room temperature, the resulting solution is treated with 25.0 g. of 3 - dimethylaminopropyl chloride and then stirred and refluxed for three hours. After cooling, the mixture is treated with 150 ml. of water. The layers are separated and the organic phase extracted with 25 ml. of conc. hydrochloric acid in 300 ml. of water. The mixture is shaken and 25 ml. of ethanol is added to clarify the resulting emulsion. The aqueous phase is then washed with 200 ml. of ether, cooled and treated with a solution of 18 g. of sodium hydroxide in 50 ml. of water. The liberated base is extracted three times with 600 ml. portions of ether. After drying the combined ether phase with magnesium sulfate, the solvent is evaporated to give about 66 g. of colorless product, M.P. about 81–83°.

EXAMPLE 18

2′-(3-dimethylaminopropylthio)cinnamanilide hydrochloride

A solution of 17.6 g. of material from Example 17 in 25 ml. of ethanol–50 ml. of ether is treated with 8.6 ml. of 6.0 N alcoholic hydrogen chloride. The resulting solution is diluted to 700 ml. with ether to yield a gummy product. The mother liquor is decanted from the product and the latter dissolved in 50 ml. of warm acetonitrile. The solution is diluted with 50 ml. of ether to give about 19.0 g. of colorless solid, M.P. about 111–112°. After crystallization from 60 ml. of isopropyl alcohol, the product melts at about 145–147°.

EXAMPLE 19

2'-(3-dimethylaminopropylthio)cinnamanilide, methochloride

A solution of 34 g. of material from Example 17 in 200 ml. of acetonitrile is cooled and treated with 15.0 g. of methyl chloride. After standing at room temperature, the mixture is diluted with 500 ml. of ether and the colorless product is filtered and dried.

EXAMPLE 20

2'-(2-dimethylaminoethylthio)cinnamanilide hydrochloride

The reaction is carried out in the same manner as in Example 17 except that 25.0 g. of 2-dimethylaminoethyl chloride is substituted for the 3-dimethylaminopropyl chloride. After the mixture is refluxed for three hours, the mixture is cooled and treated with 150 ml. of water. The aqueous layer is discarded and the organic phase shaken with a solution of 25 ml. of conc. hydrochloric acid in 300 ml. of water. The hydrochloride crystallizes from the mixture and is filtered and dried; M.P. about 161–163°. Recrystallization of 66 g. of this material from 250 ml. of ethanol gives about 59 g. of colorless solid; M.P. about 163–165°.

EXAMPLE 21

2'-[3-(1-methyl-4-piperazinyl)propylthio]cinnamanilide dihydrochloride, hemihydrate By substitution of 33 g. of 1-(3-chloropropyl)-4-methylpiperazine for the 3-dimethylaminopropyl chloride in Example 17, there is obtained the base as an oil. The latter is dissolved in absolute alcohol and treated with excess alcoholic hydrogen chloride. Dilution of the solution with ether gives a gummy solid which solidified on trituration with hot butanone. Purification is carried out by recrystallizations from ethanol and dimethylformamide; M.P. about 218–220°.

Similarly by substituting 1-(3-chloropropyl)-4-(2-hydroxyethy)-piperazine, 1-(3-chloropropyl)-4-(2-acetoxyethyl)piperazine, 1-(2-chloroethyl) - 4 - [2-(2'-hydroxyethoxy)ethyl]piperazine, 1-(3 - chloropropyl)piperidine, 1-(2-chloropropyl)pyrrolidine, 4-(3 - chlorobutyl)-morpholine, and 1-methyl-3-(3-chloropropyl)piperidine for the 1-(3-chloropropyl)-4-methylpiperazine in the procedure of Example 21, the dihydrochloride salt of the following compounds are obtained respectively: 2'-[3-(1-(2-hydroxyethyl) - 4 - piperazinyl)propylthio] - cinnamanilide; 2' - [3 - (1-(2-acetoxyethyl)-4-piperazinyl) propylthio]-cinnamanilide; 2'[2-(4-[2''-hydroxyethoxy) ethyl]-4-piperazinyl) - ethylthio]cinnamanilide; 2' - [3-piperidinopropylthio)cinnamanilide; 2' - (2-pyrrolidinopropylthio)cinnamanilide; 2'-(3-morpholinobutylthio)-cinnamanilide and 2'[3-(1-methyl-3-piperidyl)-propylthio]cinnamanilide.

EXAMPLE 22

2'-[2-(benzylmethylamino)ethylthio]cinnamanilide, hydrochloride

Replacement of the 3-dimethylaminopropyl chloride in Example 17 with 46 g. of 2-(benzylmethylamino)ethyl chloride gives the free base as an oil. An ethereal solution of this material on treatment with an ethereal solution of hydrogen chloride gives a nearly colorless solid. After crystallization from acetonitrile, the colorless product melts at about 171–173°.

EXAMPLE 23

2 - chloro - 2'-(2-dimethylaminoethylthio)cinnamanilide hydrochloride (a) Preparation of 3,5-dihydro-2(o-chlorophenyl)-1,5-benzothiazepin-4-one.—A mixture of 60.3 g. of o-chlorocinnamic acid and 41.5 g. 2-aminobenzenethiol is heated at 180–200° for one hour, cooled and purified by recrystallizations for acetonitrile, toluene, and absolute alcohol; M.P. about 185–187°.

(b) Preparation of 2-chloro-2'-(2-dimethylaminoethylthio)cinnamanilide, hydrochloride.—Interaction of 6.6 g. of material from step a with 0.9 g. of sodamide and 4.0 g. of 2-dimethylaminoethyl chloride in toluene according to the procedure of Example 17 gives the product as an oil. Solution of this oil in ether and subsequent treatment with ethereal hydrogen chloride gives a colorless material; M.P. about 165–168°. After crystallization from acetonitrile, the product melts at about 180–182°.

EXAMPLE 24

2-chloro-2'-(2-diallylaminoethylthio)cinnamanilide hydrochloride

Following the procedure of Example 23 but substituting 5.0 g. of 2-diallylaminoethyl chloride for the 2-dimethylaminoethyl chloride in part (b), 2-chloro-2'-(2-diallylaminoethylthio)cinnamanilide, hydrochloride is obtained.

EXAMPLE 25

2'-{3-[4-(o-methoxyphenyl)-1-piperazinyl]propylthio} cinnamanilide hydrochloride (a) Preparation of 2'-(3-chloropropylthio)cinnamanilide.—A suspension of 71.0 g. of 2,3-dihydro-2-phenyl-1,5-benzothiazepin-4(5H)-one in 130 ml. of isopropyl alcohol is added to a stirred solution of 15 g. of sodium methoxide in 400 ml. of isopropyl alcohol and the mixture is refluxed for 20 min. The orange-red solution is cooled to 40°, treated with 52 g. of trimethylenechlorobromide and the mixture is refluxed for 5 hours. The bulk of the solvent is removed under reduced pressure; the residue is cooled and treated with 1 l. of water and 400 ml. of hexane. The product is filtered, washed with water and dried; yield, 83 g., M.P. 110–112°. A sample crystallized from isopropyl alcohol melts at 114–116°.

(b) Preparation of 2'-{3-[4-(o-methoxyphenyl)-1-piperazinyl]propylthio}cinnamanilide hydrochloride.—A solution of 9.2 g. of material from part (a) in 65 ml. of acetone is added to a solution of 4.2 g. of sodium iodide in 50 ml. of acetone and the mixture is refluxed for 90 minutes. To this mixture is added a solution of 12 g. of 1-(o-methoxyphenyl)-piperazine in 15 ml. of acetone and then refluxed for 5 hours. The solvent is removed under reduced pressure; the residue is cooled and treated with 200 ml. of water and a solution of 3 g. of sodium hydroxide in 10 ml. of water. The base is extracted with ether several times. The combined ether extracts are washed with 50 ml. of water several times. The ether phase is separated and dried over magnesium sulfate, filtered and the solvent evaporated to give 17 g. of free base. This material is dissolved in 40 ml. of ethanol and treated with a solution of 13 ml. of 4.9 N alcoholic hydrogen chloride. Dilution of the resulting solution with anhydrous ether gives 21 g. of hydrochloride, M.P. 165–170°. Recrystallization from 110 ml. isopropyl alcohol gives 7.8 g of material, M.P. 172–174°. The latter is triturated with 100 ml. of cold water and filtered to give 4.8 g. of product, M.P. 188–180°. Recrystallization of this material from 250 ml. of acetonitrile gives 4.0 g. of colorless hydrochloride salt, M.P. 191–193°.

EXAMPLE 26

2'-[-3-(4-phenyl-1-piperazinyl)propylthio]cinnamanilide hydrochloride

A solution of 31.0 g. of the material from part (a) of Example 25 is added to a solution of 14 g. of sodium iodide in 150 ml. of acetone and then refluxed for 90 minutes. This mixture is cooled and treated with a solution of 30 g. of 1-phenylpiperazine in 50 ml. of acetone and then refluxed for 4 hours. The product is isolated in the manner described in part (b) of Example 25 to give first the base and then 41 g. of the hydrochloride salt, M.P. 185–190°. After crystallization from 1.2 1. of methanol, the hydrogen chloride salt weighs 25 g., M.P. 207–209°. Recrystallization from 650 ml. of methanol gives a colorless solid, M.P. 208–210°.

EXAMPLE 27

*2'-{3-[4-(o-methoxyphenyl)-1-piperazinyl]propoxy} cinnamanilide dihydrochloride*

A solution of 20.0 g. of the material from part (a) of Example 25 in 125 ml. of acetone is added to a solution of 9.0 g. of sodium iodide in 100 ml. of acetone. The mixture is stirred and refluxed for 90 minutes, cooled and treated with a solution of 20 g. of 1-(2-pyridyl)piperazine in 25 ml. of acetone. After refluxing this mixture for 5 hours, the product is isolated in the manner described in part (b) of Example 25 to give 17.0 g. of base. The latter is dissolved in 50 ml. of ethanol and treated with 22 ml. of 3.5 N hydrochloric acid to give a colorless solid melting at 192–195°. After recrystallization from ethanol, the dihydrochloride salt melts at 194–196°.

EXAMPLE 28

*2'-{3-[4-(o-Methoxyphenyl)-1-piperazinyl]propoxy} cinnamanilide hydrochloride*

Following the procedure of Example 25, but substituting an equivalent quantity of 2-hydroxycinnamanilide [Ann, 573, 121 (1951)] for the 2,3-dihydro-2-phenyl-1,5-benzothiazepin-4(5H)-one in part a, 2'{3-[4-(o-methoxyphenyl - 1-piperazinyl]propoxy}cinnamanilide hydrochloride is obtained.

EXAMPLE 29

*2'-[2-(4-benzyl-1-piperazinyl)ethoxy]-p-trifluoromethylcinnamanilide hydrochloride*

Interaction of o-nitrophenyl with 1-(2-chloroethyl)-4-benzylpiperazine in the presence of an equivalent of sodium methoxide in isopropyl alcohol in the manner described in part (a) of Example 25 gives 2-[2-(4-benzyl-1-piperazinyl)ethoxy]nitrobenzene. Reduction of the nitro group with stannous chloride gives 2-[2-(4-benzyl-1-piperazinyl)ethoxy]aniline. The latter is then reacted with p-trifluoromethylcinnamoyl chloride to give 2'-[2-(4-benzyl-1-piperazinyl)-ethoxy]-p-trifluoromethylcinnamanilide hydrochloride.

EXAMPLE 30

*2'-{4-[4-(p-methoxyphenyl)-1-piperzinyl]butoxy} cinnamanilide hydrochloride*

Interaction of o-nitrophenol with tetramethylenechlorobromide in the presence of an equivalent of sodium methoxide in isopropyl alcohol in the manner described in part (a) of Example 25 gives 2-(4-chlorobutoxy)nitrobenzene, B.P. 150–155° (0.1 mm.). Subsequent reaction of this material with 1-(p-methoxyphenol)-piperazine gives 2-{4-[4-(p-methoxyphenyl)-1-piperazinyl]butoxy} nitrobenzene. Reduction of the intro group with stannous chloride gives 2-{4-[4-(p-methoxyphenyl)-1-piperazinyl]butoxy}aniline. The latter is then reacted with cinnamoyl chloride to give 2'{4-[4-(p-methoxyphenyl)-1-piperazinyl]butoxy}cinnamanilide hydrochloride.

EXAMPLE 31

*5'chloro-2'-{3-[4-(o-methoxyphenyl)-1-piperazinyl] propylthio} cinnamanilide hydrochloride*

Following the procedure of Example 25 but substituting an equivalent quantity of 7-chloro-2,3-dihydro-2-phenyl-1,5-benzothiazepin-4(5H)-one for the 2,3-dihydro-2-phenyl-1,5-benzothiazepin-4(5H)-one in part a, 5'-chloro-2'-{3-[4-(o-methoxyphenyl)-1-piperazinyl]-propylthio} cinnacinnamanilide hydrochloride is obtained.

EXAMPLE 32

*2'-{3-[4-(-o-methoxyphenyl)-1-piperazinyl]propylthio} p-methoxycinnamanilide hydrochloride*

Following the procedure of Example 25 but substituting an equivalent quantity of 2,3-dihydro-2-(o-methoxyphenyl)-1,5-benzothiazepin-4(5H)-one in part a, 2'-{3-[4-(o-methoxyphenyl)-1-piperazinyl]propylthio} - p - methoxycinnamanilide hydrochloride is obtained.

EXAMPLE 33

*2'-{3-[4-(o-methoxyphenyl)-1-piperazinyl]propoxy})-α-propylcinnamanilide hydrochloride*

Following the procedure of Example 25, but substituting an equivalent quantity of 2-hydroxy-α-propylcinnamanilide for the 2,3-dihydro-2-phenyl-1,5-benzothiazepin-4(5H)-one in part a, 2'-{3-[4-(o-methoxyphenyl)-1-piperazinyl]propoxy} -α-propylcinnamanilide hydrochloride is obtained.

EXAMPLE 34

*2'-{3-[4-(p-chlorophenethyl)-1-piperazinyl]propylthio} cinnamanilide hydrochloride*

Following the procedure of Example 25, but substituting an equivalent quantity of 1-(p-chlorophenethyl)-piperazine for the 1-(o-methoxyphenyl)piperazine in part b, 2'-{3-[4-(p - chlorophenethyl)-1-piperazinyl]propylthio} cinnamanilide hydrochloride is obtained.

What is claimed is:
1. A compound selected from the group consisting of bases of the formula

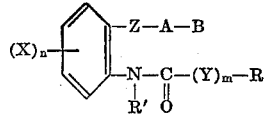

and pharmaceutically-acceptable acid addition and quaternary ammonium salts thereof, wherein X is selected from the group consisting of hydrogen, halogen, trifluoromethyl, nitro, lower alkyl, lower alkoxy and lower alkanoyl; $n$ is a positive integer less than four; A is lower alkylene; B is a member of the group consisting of amino, (lower alkyl)amino, di(lower alkyl)amino, (hydroxy-lower alkyl)amino, di(hydroxy-lower alkyl)amino, $(X)_n$-phenyl(lower alkyl)amino, N-(lower alkyl) - N - [$(X)_n$-phenyl(lower alkyl)]amino, alkylamino, dialkylamino, piperidino, (lower alkyl)-piperidino, di(lower alkyl)piperidino, (lower alkoxy)piperidino, piperidyl, (N-lower alkyl)piperidyl, pyrrolidino, (lower alkyl)-pyrrolidino, di(lower alkyl)pyrrolidino, (lower alkoxy)pyrrolidino, pyrrolidyl, (N-lower alkyl) pyrrolidyl, morpholino, (lower alkyl)morpholino, di(lower alkyl)morpholino, (lower alkoxy)morpholino, thiamorpholino, (lower alkyl) thiamorpholino, di(lower alkyl) thiamorpholino, (lower alkoxy)thiamorpholino, piperazino, (lower alkyl) piperazino, di(lower akyl)piperazino, (hydroxy-lower alkyl) piperazino, (lower alkoxy)piperazino, (lower alkanoyloxy-lower alkyl)piperazino, (hydroxy-lower alkoxy-lower alkyl)piperazino, phenylpiperazino, (lower alkylphenyl)piperazino, (lower alkoxyphenyl)piperazino, (phenyl-lower alkyl)piperazino, (lower alkoxyphenyl-lower alkyl)piperazino, (halophenyl-lower alkyl)piperazino, 4-(pyridyl)piperazino and 4-(pyrimidyl)piperazino; Z is selected from the group consisting of oxa and thia; R' is selected from the group consisting of hydrogen, lower alkyl and phenyl-(lower alkyl); Y is selected from the group consisting of lower alkylene, lower alkenylene, and lower alkadienylene; $m$ is selected from the group consisting of zero and one; and R is selected from the group consisting of hydrogen, lower alkyl, cyclic-lower alkyl, $(X)_n$-substituted phenyl, furyl, thienyl, pyridyl and piperonyl.

2. 2'-[di(lower alkyl)amino(lower alkyl)thio]cinnamanilide.

3. 2'-(3-dimethylaminopropylthio)cinnamanilide.

4. A pharmaceutically-acceptable acid-addition salt of 2'-[di(lower alkyl) amino(lower alkyl) thio]cinnamanilide.

5. A pharmaceutically-acceptable acid-addition salt of 2'-[3-(1-methyl-4-piperazin)propylthio]cinnamanilide.

6. A pharmaceutically-acceptable acid-addition salt of 2'-[2-(benzylmethylamino)ethylthio]cinnamanilide.

7. A compound of the formula

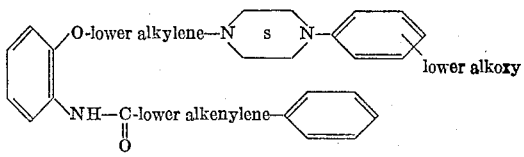

8. A compound of the formula

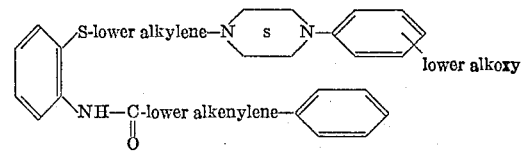

9. A compound of the formula

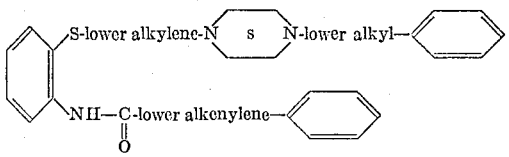

10. A compound of the formula

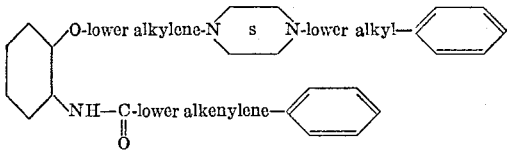

11. 2'-{3-[4-(o-methoxyphenyl)-1-piperazinyl]propylthio}cinnamanilide.

12. 2'-[3-(4-phenyl-1-piperazinyl)propylthio]cinnamanilide.

13. 2' - {4 - [4 - (o-methoxyphenyl)-1-piperazinyl]propoxy}cinnamanilide.

References Cited by the Examiner

UNITED STATES PATENTS

| | | | |
|---|---|---|---|
| 2,824,872 | 2/58 | Lassauniere | 260—570.7 X |
| 2,921,961 | 1/60 | Muller et al. | 260—570.7 X |
| 2,966,518 | 12/60 | Johnson | 260—570.7 |
| 3,057,919 | 10/62 | Pursglove | 260—558 |
| 3,133,075 | 5/64 | Clinton et al. | 260—570.7 X |
| 3,139,456 | 6/64 | Tweit | 260—570.7 |
| 3,141,041 | 7/64 | Taylor | 260—558 |
| 3,142,554 | 7/64 | Godfrey | 260—570.7 X |

NICHOLAS S. RIZZO, *Primary Examiner.*

UNITED STATES PATENT OFFICE
CERTIFICATE OF CORRECTION

Patent No. 3,201,401                                August 17, 1965

John Krapcho

It is hereby certified that error appears in the above numbered patent requiring correction and that the said Letters Patent should read as corrected below.

Column 3, line 28, for "2-nitrobenzethiols" read -- 2-nitrobenzenethiols --; column 6, line 38, for "benbzothiazepin" read -- benzothiazepin --; column 7, line 42, for "(3-dimethaylaminopro-", in italics, read -- (3-dimethylaminopro- --; in italics; line 74, for "(2-" read -- (3- --; column 8, line 34, for "Sustitution" read -- Substitution --; line 35, for "cloride" read -- chloride --; column 13, line 10, for "2′-{3-[4-(o-methoxyphenyl)-1-piperazinyl]propoxy}", in italics, read -- 2′-{3-[4-(2-pyridyl)-1-piperazinyl]propylthio} --, in italics; column 14, line 2, for "cinnacinnamanilide" read -- cinnamanilide --; column 15, line 8, for "1-methyl-4-piperazin)" read -- 1-methyl-4-piperazinyl) --.

Signed and sealed this 15th day of February 1966.

(SEAL)
Attest:

ERNEST W. SWIDER                        EDWARD J. BRENNER
Attesting Officer                      Commissioner of Patents